D. E. TEAL.

Improvement in Tilting and Revolving Chairs

No. 5,055. Reissued Sep. 10, 1872.

Witnesses:

H. Albertsberg

W. Woell

Inventor:

Daniel E. Teal per Crosby & Gregory

Atty

AM. PHOTO-LITHOGRAPHIC CO. N.Y. (OSBORNE'S PROCESS.)

UNITED STATES PATENT OFFICE.

DANIEL E. TEAL, OF NEW LISBON, NEW YORK, ASSIGNOR TO HEYWOOD BROTHERS & COMPANY.

IMPROVEMENT IN TILTING AND REVOLVING CHAIRS.

Specification forming part of Letters Patent No. 105,516, dated July 19, 1870; reissue No. 5,055, dated September 10, 1872.

*To all whom it may concern:*

Be it known that I, DANIEL E. TEAL, of New Lisbon, in the county of Otsego and State of New York, have invented certain new and useful Improvements in Chairs; and I do hereby declare that the following is a full, clear, and exact description thereof, reference being had to the accompanying drawing making a part of this specification, in which—

Figure 1:
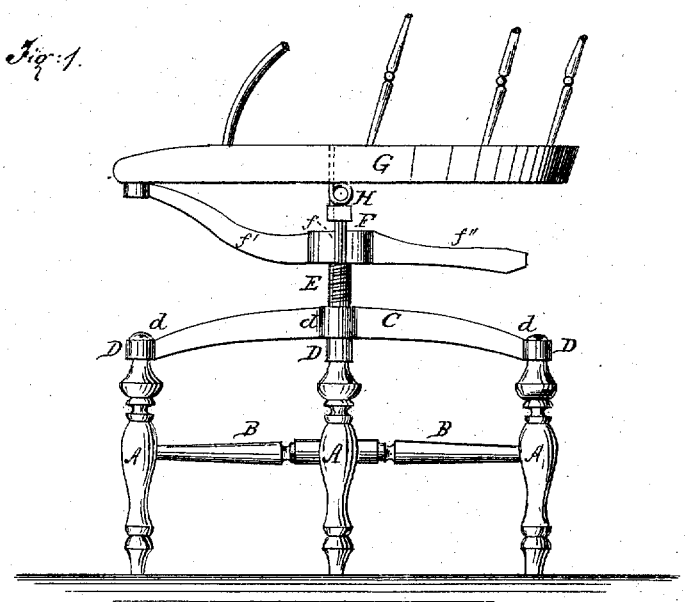
Figure 2:
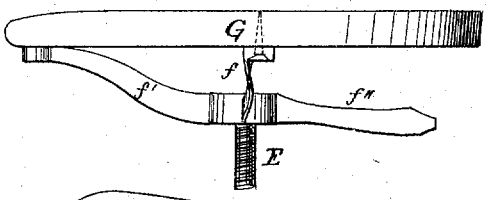
Figure 3:
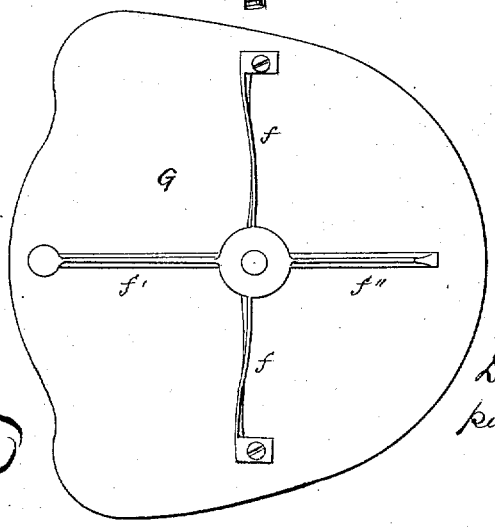

Figure 1 is a side elevation of a swivel-chair containing my improvements. Fig. 2 is a like view of a chair-seat, showing another means for connecting it to the screw; and Fig. 3 is a plan view of the lower side of same.

Letters of like name and kind refer to like parts in each of the figures.

My invention is an improvement in swivel-chairs; and it consists principally in the spider secured to or upon the upper end of the supporting screw or swivel, and upon the lower side of the seat, the side arms of which are caused to act as pivotal springs for said seat, as is hereinafter shown. It also consists in the means employed for connecting together the upper ends of the legs of the stool, and furnishing a support for the nut containing the swivel-screw, as is hereinafter shown.

In the annexed drawing, A and A represent the legs of the stool, connected together near their centers lengthwise by means of transverse intersecting rounds B, and at their upper ends by means of a metal spider, C, which consists of four arms, secured at their inner ends to a nut prepared for the reception of the pivotal screw, and from thence extending radially outward, are each provided at their outer ends with a vertical socket, D, for the reception of the upper ends of said legs, the latter of which are secured within said sockets by means of screws *d* passing vertically downward into the wood, and having beneath their heads washers of sufficient size to extend beyond said wood and embrace the upper ends of the metal. Secured to or upon the upper end of the screw E is a metal spider, F, having four arms which extend radially outward from the center to or near the outer edge of the seat G. The side arms *f* extend slightly upward from the center, and are connected to the seat by means of a spiral spring, H, the opposite ends of which are secured within said seat and the outer ends of said arm, so as to form a pivotal joint between said seat and the spider. The front arm *f'* extends upward so as to bear against and support the front edge of the seat when the latter is in a horizontal position, while the height of the rear arm *f''* is so adjusted as to permit said stool to be tilted or rocked to the rear as far as safety will permit, when it rests upon and is supported by means of the rear end of said arm.

In Fig. 2 is shown a modification of the spider, in which the side arms *f* are formed of spring steel, and have a sufficient depth to enable them to support the required weight, while their thickness is such as to give them the necessary twisting or lateral spring. As thus constructed, said arms are secured at their outer ends directly to or upon the bottom of the seat, and serve not only as a support therefor, but also as a pivotal joint between the same and the spider.

Having thus fully set forth the nature and merits of my invention, what I claim as new, is—

1. A swivel-chair, in combination with a tilting seat, when the interposing springs are secured to a metallic spider and to the chair-seat, as described.

2. Also, the supporting spider F, constructed as described, with side spring arms *f*, and connected to the screw E and seat G, substantially as and for the purpose shown.

3. Also, the spider C, provided with the sockets D for connecting together, and in combination with, the legs A, substantially as shown and described.

Witnesses: DANIEL E. TEAL.

ALFRED THURSTON,

G. CLAYTON PECK.